United States Patent
Kobayashi et al.

(10) Patent No.: US 7,093,943 B2
(45) Date of Patent: *Aug. 22, 2006

(54) PROJECTOR WITH FOREIGN MATTER DETECTING MEANS

(75) Inventors: Hiroyuki Kobayashi, Tokyo (JP); Kunitaka Furuichi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,816

(22) Filed: Jul. 19, 2005

(65) Prior Publication Data

US 2005/0264769 A1 Dec. 1, 2005

Related U.S. Application Data

(62) Division of application No. 10/177,123, filed on Feb. 13, 2004, now Pat. No. 6,929,370.

(30) Foreign Application Priority Data

Mar. 14, 2003 (JP) .............................. 2003-070476

(51) Int. Cl.
*G03B 21/16* (2006.01)
*G03B 21/14* (2006.01)

(52) U.S. Cl. ....................... 353/122; 353/119

(58) Field of Classification Search .................. 353/55, 353/52, 69, 70, 98, 99, 119, 121, 94, 122; 348/748, 787, 818, 823, 832, 835; 356/614, 356/621, 622, 638–640

See application file for complete search history.

(56) References Cited

U.S. PATENT DOCUMENTS

| 4,765,733 | A | 8/1988 | Negishi ........................ 353/99 |
| 5,077,467 | A | 12/1991 | Barron et al. ................ 250/221 |
| 6,231,191 | B1 | 5/2001 | Shiraishi et al. .............. 353/61 |
| 6,705,356 | B1 | 3/2004 | Barton et al. ................... 141/2 |
| 6,929,370 | B1 * | 8/2005 | Kobayashi et al. ........... 353/99 |
| 2002/0122161 | A1 | 9/2002 | Nishida et al. ............... 353/70 |
| 2004/0031095 | A1 | 2/2004 | Yamamoto ..................... 4/619 |

FOREIGN PATENT DOCUMENTS

JP 11-119343 4/1999

* cited by examiner

*Primary Examiner*—W. B. Perkey
*Assistant Examiner*—Andrew Sever
(74) *Attorney, Agent, or Firm*—Young & Thompson (57) ABSTRACT

A projector has an image generating device for generating an image, and a housing, having the image generating device disposed therein and having an opening defined therein for emitting therethrough projection light representing the image from the image generating device. A projection mirror is mounted on an outer surface of the housing for reflecting the projection light to project the image onto a projection surface. An optical system is disposed in the opening for applying the projection light to the projection mirror. The projector also has a foreign matter detector for detecting foreign matter which enters a light path of the projection light between the optical system and the projection mirror.

20 Claims, 8 Drawing Sheets

PROJECTOR WITH FOREIGN MATTER DETECTING MEANS

This application is a division of application Ser. No. 10/777,123, filed on Feb. 13, 2004 now U.S. Pat. No. 6,929,370, the entire contents of which are hereby incorporated by reference.

BACKGROUND OF THE INVENTION

1. Field of the Invention

The present invention relates to a projector having a projection mirror for reflecting projection image light generated by an image generating device to project an enlarged image onto a projection surface such as an external screen or the like, and more particularly to a projector which is designed for higher luminance and has a foreign matter detecting means.

2. Description of the Related Art

Projectors for projecting an enlarged view of image light generated by an image generating device onto a projection surface such as an external screen or the like are used in various applications. In recent years, efforts have been made to increase the luminance of images projected by projectors, and, as a result, more and more projectors project highly intensive light to form bright images. Accordingly, such projectors have projection lens that are heated to very high temperatures.

Recently, there has been disclosed a projector having a housing from which projection light is emitted through an opening defined in the housing, and a projection mirror for reflecting the projection light to project an image onto a projection surface.

Figure 1:
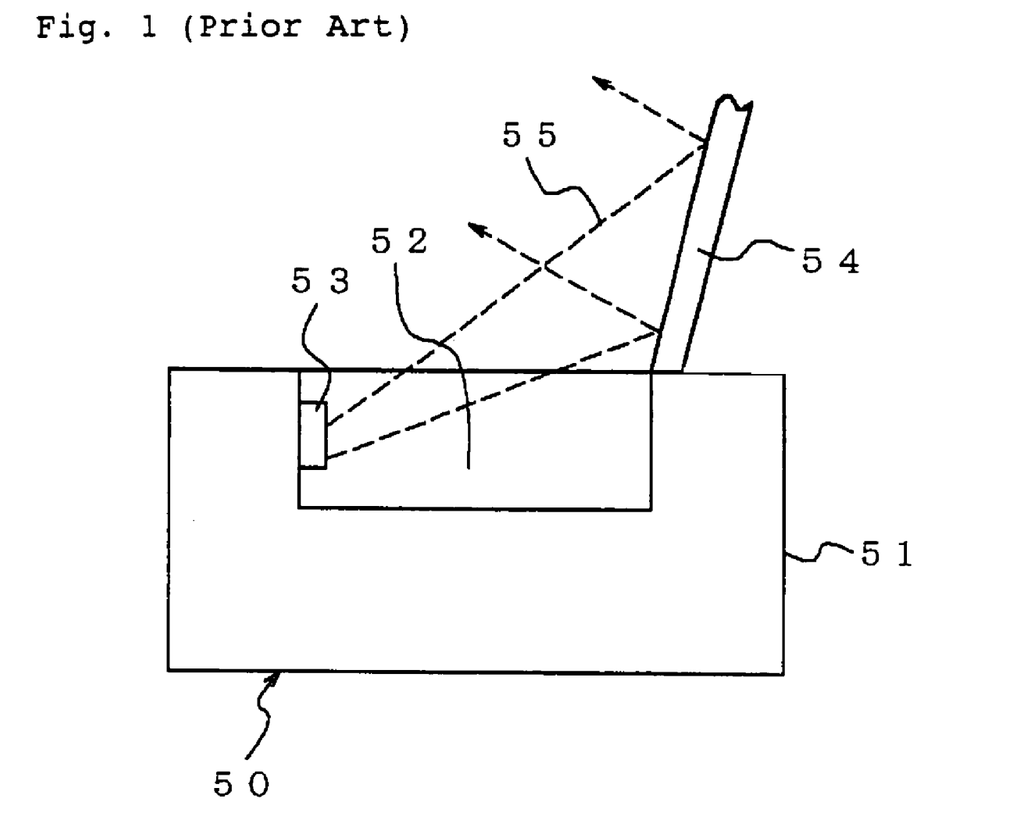
FIG. 1 is a side elevational view of a conventional projection-mirror-type projector.

As shown in FIG. 1 of a schematic side elevational view, projector 50 has housing 51 with opening 52 defined therein. Opening lens 53 for projecting projection light is disposed in opening 52. Housing 51 supports thereon projection mirror 54 disposed in confronting relation to opening lens 53. When projector 50 is in use, projection image light 55 generated by an image generating device is emitted through opening lens 53 from opening 52, and reflected by projection mirror 54 to project an enlarged image onto an external screen (not shown). A light source, the image generating device, and an optical system of projector 50 are omitted from illustration. Projection mirror 54 may also be used as a lid for opening 52, and may be turned down to close opening 52 when projector 50 is not in use.

Figure 2A:
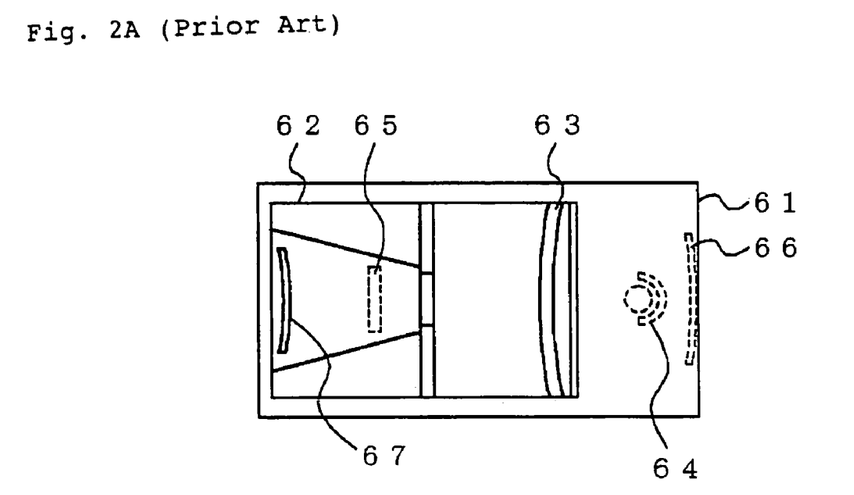
FIG. 2A is a plan view of another conventional projection-mirror-type projector.
Figure 2B:
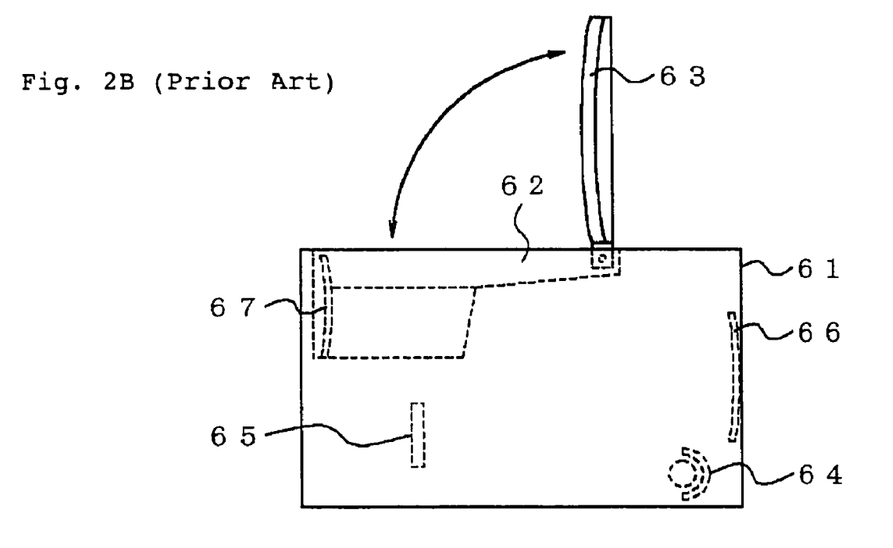
FIG. 2B is a side elevational view of the conventional projection-mirror-type projector shown in FIG. 2A.

Japanese laid-open patent publication No. 11-119343 discloses a projection-mirror-type projector as shown in FIGS. 2A and 2B of the accompanying drawings. The disclosed projector comprises light source 64, liquid crystal display device 65, projection mirror 63 for projecting projection light modulated by an image which is displayed by liquid crystal display device 65 onto an external screen or the like, a pair of reflection mirrors 66, 67 for reflecting the projection light from liquid crystal display device 65 toward projection mirror 63, and housing 61 which accommodates therein the projection optical system including light source 64, liquid crystal display device 65, and reflection mirrors 63, 66, 67.

Housing 61 has opening 62 provided therein between liquid crystal display device 65 in housing 61 and projection mirror 63, for emitting the projection light from liquid crystal display device 65 toward projection mirror 63. Projection mirror 63 is angularly movably mounted on housing 61 for selectively opening or closing opening 62. Projection mirror 63 serves as part of the projection optical system when it opens opening 62, and serves as a lid for opening 62 when it closes opening 62.

As described above, with the projector having the projection mirror, the opening lens and the reflection mirrors which are heated to a relatively high temperature are exposed out of the housing. Furthermore, when foreign matter such as a user's finger, an object in the room, or dust particles enters the opening, a sharp temperature rise occurs because the projection light directed toward the projection mirror is blocked by the foreign matter. Since such a sharp temperature rise may possibly cause a burn on the user or a fire in worst cases, some countermeasures need to be combined with the projector.

For example, in case a detecting circuit with a sensor assembly for simply detecting foreign matter that enters the opening is added, huge quantities of sensors are needed. In case the sensor assembly generally detects foreign matter in a wide range of space, there needs a plurality of sensors. Furthermore, as the size of foreign matter to be detected is smaller, the sensor assembly requires an increased number of sensors, and hence the detecting circuit becomes larger in circuit scale.

If the projection-mirror-type projector disclosed in Japanese laid-open patent publication No. 11-119343 is designed for higher luminance, then the intensity of the projection light in the vicinity of the reflection mirrors is increased, resulting in a higher temperature at those reflection mirrors. However, there is nothing disclosed in Japanese laid-open patent publication No. 11-119343 about countermeasures against foreign matter which may possibly find its way into the path of the projection light.

SUMMARY OF THE INVENTION

It is an object of the present invention to provide a projector which is of a relatively simple structure and is capable of efficiently detecting foreign matter, even if it is small in size, in a relatively large range of space.

To achieve the above object, a projector according to the present invention has an image generating device for generating an image, a housing, the image generating device being disposed in the housing, the housing having an opening defined therein for emitting therethrough projection light representing the image from the image generating device, a projection mirror mounted on an outer surface of the housing for reflecting the projection light to project the image onto a projection surface, optical means disposed in the opening for applying the projection light from the image generating device to the projection mirror, and foreign matter detecting means for detecting foreign matter which enters a light path of the projection light between the optical means and the projection mirror.

The foreign matter detecting means comprises a light-emitting element for emitting foreign matter detection light for detecting foreign matter across the light path of the projection light, a plurality of detection mirrors for reflecting the detection light across the light path of the projection light, a light-detecting element for detecting the detection light which has been reflected by the detection mirrors, and an electric circuit for controlling the projector in response to an output signal, representing the detected foreign matter detection light, from the light-detecting element.

The light-emitting element comprises a semiconductor light-emitting device such as a semiconductor laser, a light-emitting diode (LED), or the like, for emitting the detection light which has a wavelength different from the wavelength of the projection light. The light-detecting element comprises a semiconductor light-detecting device such as a photodiode or the like.

The detection mirrors of the foreign matter detecting means comprise two detection mirrors which are disposed in confronting relation to each other across the light path of the projection light, for reflecting the detection light in multiple paths therebetween. Alternatively, a plurality of the detection mirrors are disposed in confronting relation to each other across the light path of the projection light, for reflecting the detection light successively therebetween.

The electric circuit comprises a detecting circuit for detecting whether the detection light is detected or not in response to the output signal from the light-detecting element, a lamp control circuit for turning on and off a light source lamp which emits the projection light, in response to an output signal from the detecting circuit, a timer circuit for monitoring the output signal from the detecting circuit for a predetermined period of time to determine whether the projector is in a dangerous situation or not, and a power supply control circuit for turning on and off a power supply of the projector in response to the determination made by the timer circuit.

As described above, according to the projector of the present invention, the foreign matter detecting means is disposed in a region near the optical means where the projection light emitted from the opening in the housing is highly intensive, and detects the entry of foreign matter to keep the region near the optical means in safety. When the foreign matter detecting means detects foreign matter that enters the light path of the projection light, the light source lamp is turned off and the power supply is turned off for safety. The light-emitting element of the foreign matter detecting means is arranged so as not to spread the beam of the detection light or so as to give some directivity to the beam of the detection light. The detection mirrors for reflecting the detection light from the light-emitting element is disposed between the light-emitting element and the light-detecting element to guide the detection light to the light-detecting element, so that the blocking of the detection light by foreign matter can be detected. The light-emitting element and the light-detecting element which are provided in a pair are easily capable of detecting small foreign matter that has entered the light path in a relatively large range of space with a minimum circuit scale.

The above and other objects, features, and advantages of the present invention will become apparent from the following description with reference to the accompanying drawings which illustrate examples of the present invention.

DESCRIPTION OF THE PREFERRED EMBODIMENTS

Figure 3:
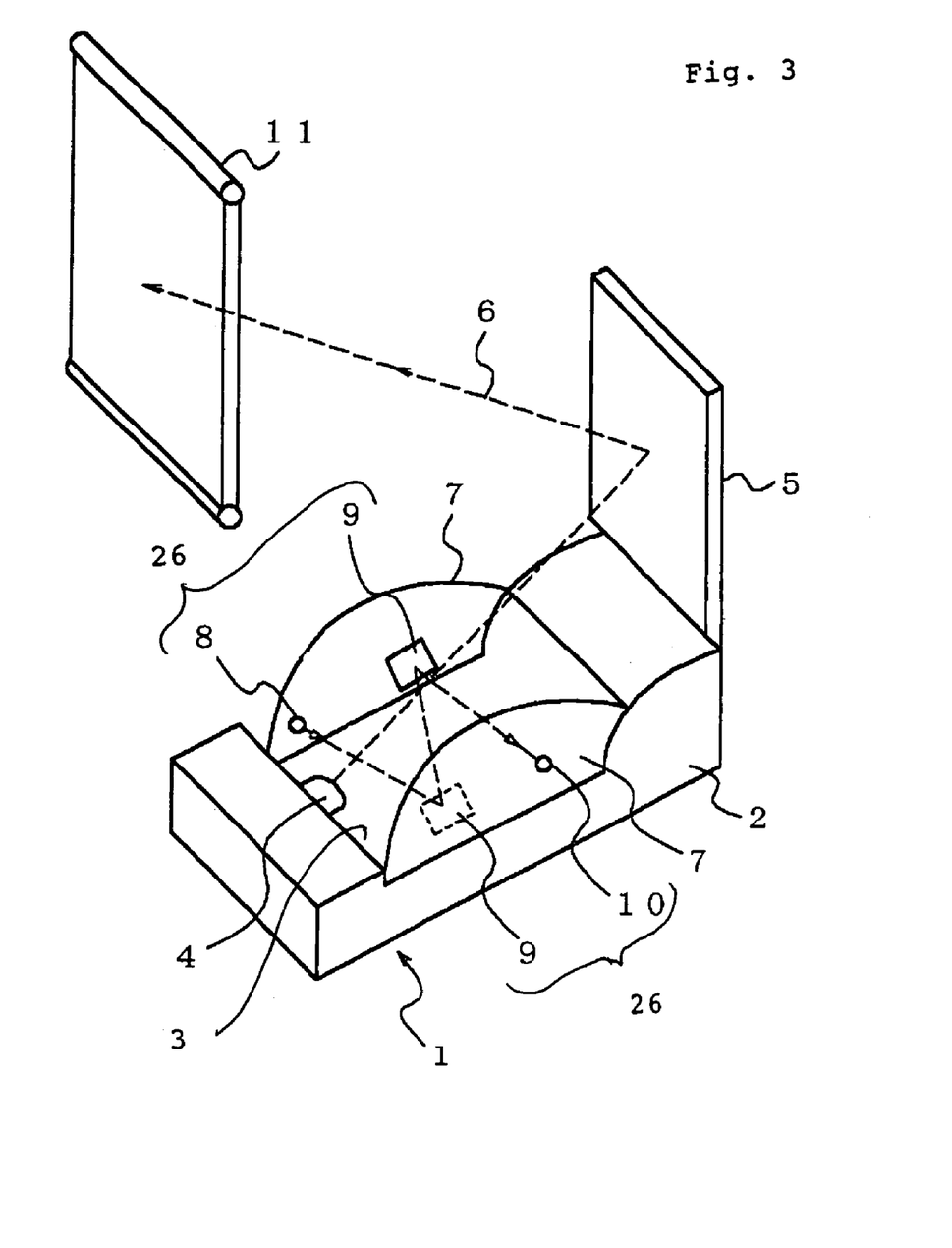
FIG. 3 is a perspective view of a projector according to a first embodiment of the present invention.
Figure 4:
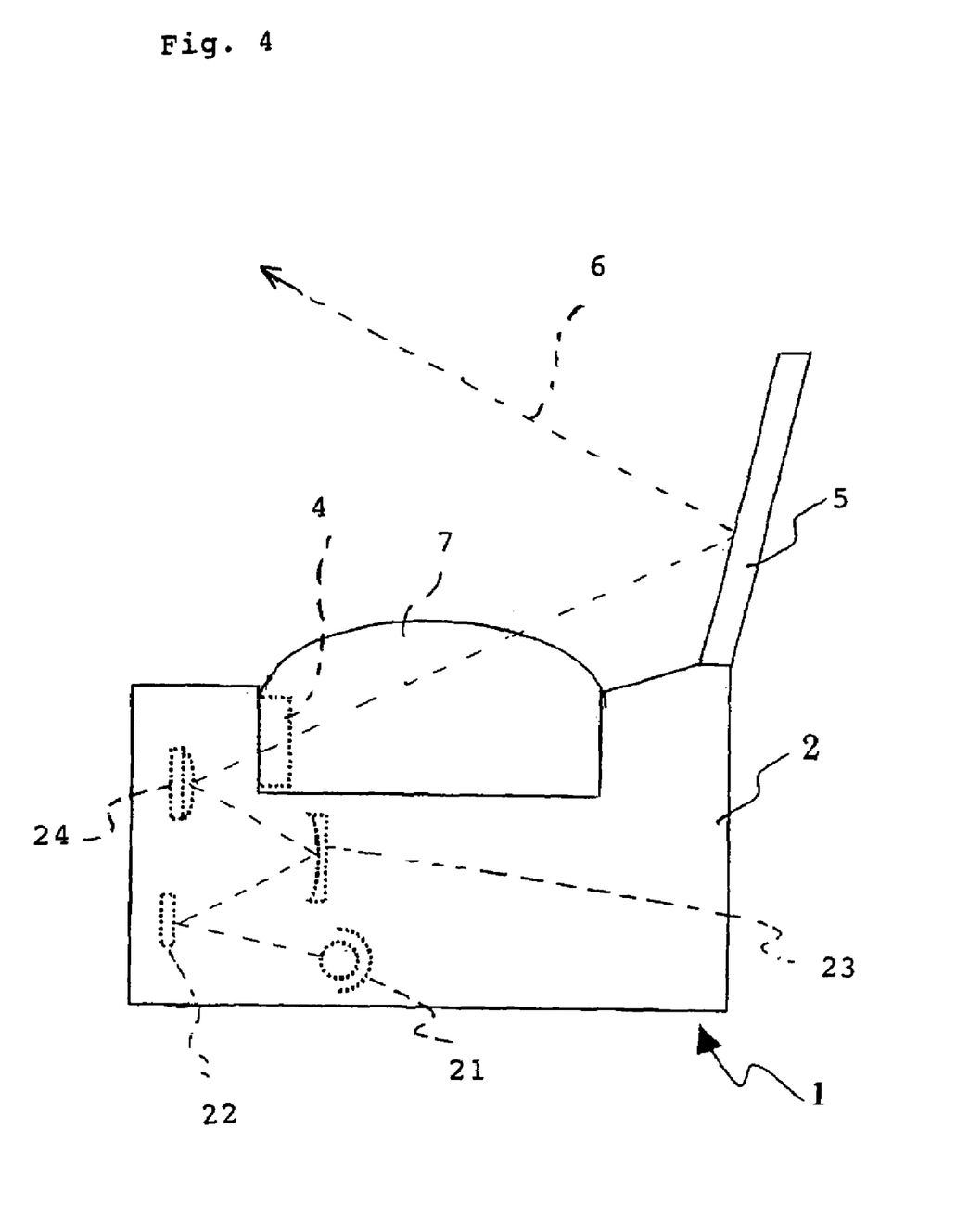
FIG. 4 is a side elevational view of the projector according to the first embodiment of the present invention.

FIG. 3 shows in perspective a projector according to a first embodiment of the present invention, and FIG. 4 shows in side elevation the projector according to the first embodiment of the present invention.

As shown in FIG. 3, projector 1 comprises housing 2 having opening 3 for emitting therethrough projection light to project an image onto a projection surface. Opening lens 4 is disposed in opening 3 and projection mirror 5 is mounted in confronting relation to opening lens 4. The interior of opening 3 is sealed to prevent dust particles and other foreign matter from entering through opening 3 into housing 2.

As shown in FIG. 4, projector 1 also comprises an optical system disposed in housing 2. The optical system includes light source lamp 21 for emitting projection light, image generating device 22 for generating an image, and reflection mirrors 23, 24 for guiding the projection light to opening lens 4. Image generating device 22 comprises, for example, a liquid crystal display device, a DMD (Digital Micromirror Device), or the like. Although not shown, projection mirror 5 may be disposed on a lid that is capable of closing opening 3 in housing 2, and when projector 1 is not in use, opening 3 may be closed by the lid.

Image projection light 6 generated by image generating device 22 is emitted through opening lens 4 and applied to projection mirror 5, which reflects image projection light 6 and projects an enlarged image thereof onto external screen 11.

On the light path between image generating device 22 and opening lens 4, image projection light 6 has its light beam substantially not spread, i.e., not diverged. Therefore, image projection light 6 that is emitted from opening lens 4 toward projection mirror 5 has such a very high intensity that the air in the light path of image projection light 6 is heated to a high temperature. Furthermore, when foreign matter such as a user's finger, an object in the room where the projector is installed, or dust particles blocks image projection light 6, a sharp temperature rise occurs and tends to cause dangerous situations. If the temperature of the region where the image projection light is emitted is to be lowered, then the image projection light may be spread into a light spot greater than image generating device 22. However, such a solution would not be preferable because it would require the opening and the housing to be increased in size.

According to the present embodiment, foreign matter detector 26 is disposed between opening lens 4 and projection mirror 5 in a range to be detected of the light path of image projection light 6 for preventing dangerous situations from being developed which would tend to occur when foreign matter enters the light path that is kept at a relatively high temperature between opening lens 4 and projection mirror 5.

Figure 5:
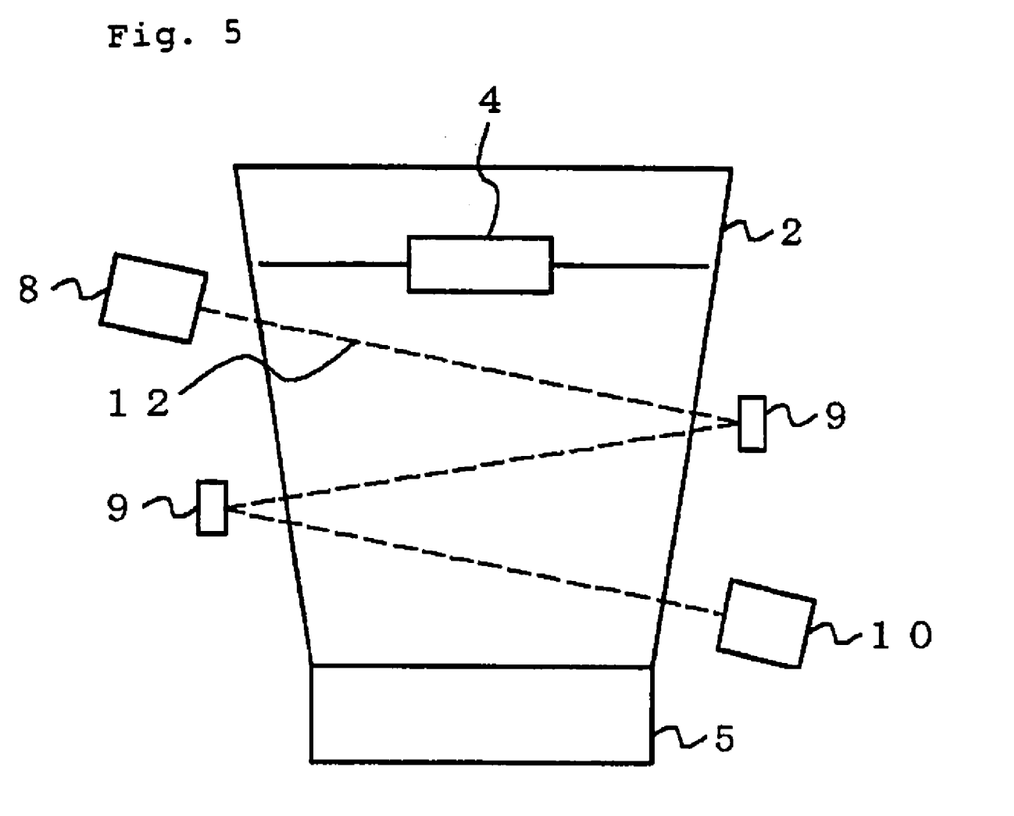
FIG. 5 is a plan view of a foreign matter detector of the projector according to the first embodiment of the present invention.

FIG. 5 shows in plan structural details of foreign matter detector is 26. As shown in FIG. 5, foreign matter detector 26 comprises light-emitting element 8 for emitting detection light 12, a plurality of detection mirrors 9 for reflecting detection light 12 emitted from light-emitting element 8, and light-detecting element 10 for detecting detection light 12 reflected by detection mirrors 9.

Housing 2 has a pair of confronting side walls 7 on the sides of opening 3. Light-emitting element 8, detection mirrors 9, and light-detecting element 10 are mounted on the confronting surfaces of side walls 7. Detection light 12 emitted from light-emitting element 8 travels transversely across the light path of image projection light 6 between opening lens 4 and projection mirror 5. Detection light 12 is then reflected a plurality of times efficiently by detection mirrors 9, and accurately detected by light-detecting element 10.

Light-emitting element 8 comprises a semiconductor light-emitting device such as a semiconductor laser for emitting infrared rays, a light-emitting diode (LED), or the like, and is arranged so as not to spread the beam of emitted detection light 12 or so as to give some directivity to the beam of emitted detection light 12. Light-detecting element 10 comprises a semiconductor photo-detecting device such as a phototransistor, a photodiode, or the like. Detection mirrors 9 are disposed in mutually confronting positions. Detection light 12 emitted from light-emitting element 8 is reflected by the reflecting surfaces of detection mirrors 9, and reliably applied to light-detecting element 10. If required, each of detection mirrors 9 has an angle adjusting function to adjust the angle of tilt of the reflecting surface thereof. Foreign matter detector 26 itself may have an angle adjusting function. In FIGS. 3 and 5, two detection mirrors 9 are shown as being disposed in confronting relation to each other. However, the number of detection mirrors may be increased if necessary.

The wavelength of detection light used by foreign matter detector 26 should preferably be selected so as to be different from the wavelengths of image projection light 6 emitted to display images, i.e., so as to be different from the wavelengths of visible light rays. Detection mirrors 9 should preferably be provided for exclusive use in detection of foreign matter. Since such dedicated detection mirrors 9 can be positioned so as not to reflect the image projection light, the contrast of projected images is prevented from being lowered.

Figure 6:
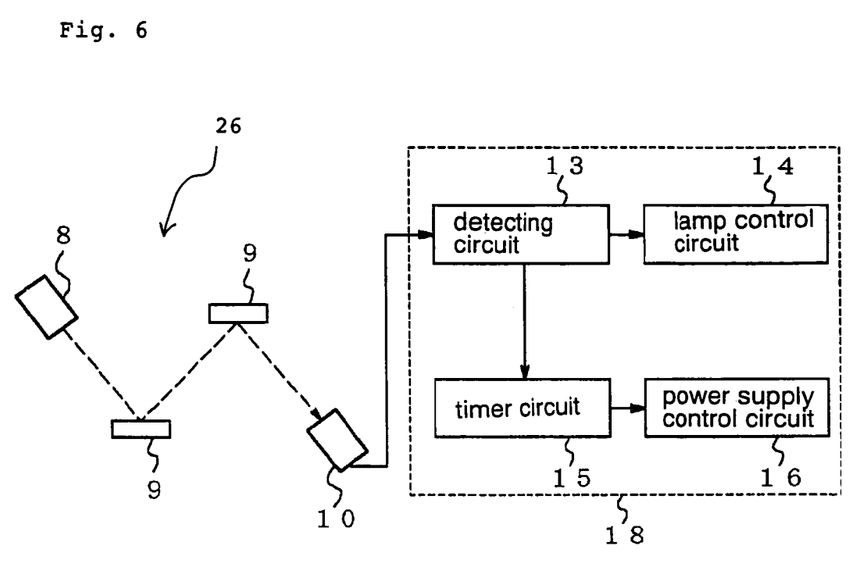
FIG. 6 is a block diagram of the foreign matter detector.

FIG. 6 shows in block form foreign matter detector 26 according to the first embodiment. As shown in FIG. 6, foreign matter detector 26 has electric circuit 18 for processing a signal that is generated when foreign matter enters the light path of image projection light 6. If foreign matter detector 26 detects that the detection light 12 is blocked by foreign matter that enters the light path, then foreign matter detector 26 turns off light source lamp 21. If foreign matter detector 26 detects that the detection of foreign matter does no longer exist, then foreign matter detector 26 turns on light source lamp 21 again to emit image projection light. If foreign matter detector 26 detects the elapse of a period of time for which foreign matter has been detected as being dangerous, then foreign matter detector 26 turns off the power supply of projector 1.

Electric circuit 18 of foreign matter detector 26 comprises detecting circuit 13 for detecting whether the detection light 12 is detected or not in response to output signal from light-detecting element 10, lamp control circuit 14 for turning on or off light source lamp 21 in response to an output signal from detecting circuit 13, timer circuit 15 for monitoring the output signal from detecting circuit 13 for a certain period of time to determine whether there has been developed a dangerous situation or not, and power supply control circuit 16 for turning on or off the power supply In response to the determination made by timer circuit 15.

In electric circuit 18, as a result of the detection by light-detecting element 10 an output signal is supplied to detecting circuit 13, which determines whether the detection light 12 is detected or not in response to an H/L output level of the output signal. For example, if the detection light 12 is detected indicating that projector 1 is normal, then detecting circuit 13 outputs an H-level output signal. If the path of the detection light 12 is blocked and hence the detection light 12 is not detected indicating that projector 1 is abnormal, then detecting circuit 13 outputs an L-level output signal representing that foreign matter has entered the light path between opening lens 4 and projection mirror 5.

If detecting circuit 13 determines that the detection light 12 is not detected, then lamp control circuit 14 judges that projector 1 is in a dangerous situation, and de-energizes light source lamp 21. Lamp control circuit 14 forcibly turns off a lamp energization control device to de-energize light source lamp 21. Specifically, lamp control circuit 14 changes the voltage of the lamp energization control device with a switching device such as a transistor to de-energize light source lamp 21. If the foreign matter is removed and the detection light 12 is detected again, lamp control circuit 14 energizes light source lamp 21 again to resume the emission of the image projection light.

Rather than de-energizing light source lamp 21, an image output may be cut off. When an image output is cut off, projector 1 displays an all-black image, i.e., emits no image projection light from opening lens 4. Therefore, the light path between opening lens 4 and projection mirror 5 is reliably prevented from being heated to a high temperature. For example, an image switcher or OSD (On-Screen Display) switcher, an image output unit, or an IC (Integrated Circuit) may be controlled to intercept images. If images are intercepted at a stage prior to the OSD switcher, then an OSD message such as an error message can be displayed.

Timer circuit 15 monitors checking several times the H/L output level from detecting circuit 13, indicating whether detection light 12 is detected or not, at intervals of several seconds on a software basis. For example, timer circuit 15 employs a counter of a timer circuit function built in a CPU (Central Processing Unit), and confirms one time the voltage level indicating that no detection light 12 is detected, every second. If timer circuit 15 finds the L output level to be constant for 10 seconds, then timer circuit 15 judges that foreign matter is present in the light path and projector 1 is in a dangerous situation. The period of time for which timer circuit 15 monitors the output level from detecting circuit 13 may be set to any desired length of time of timer circuit 15.

Power supply control circuit 16 turns off the power supply in response to the determination of a dangerous situation by timer circuit 15. Power supply control circuit 16 has a switching device such as a transistor, for example, for switching the ON control terminal voltage of the power supply to turn on or off the power supply. Alternatively, power supply control circuit 16 turns on or off the power supply with an IC on a software basis.

After power supply control circuit 16 has turned off the power supply, and when the power supply is turned on again, if the detection of foreign matter by foreign matter detector 26 has not yet been canceled, then power supply control circuit 16 interrupts the turning-on of the power supply. When foreign matter is detected, power supply control circuit 16 warns the user by displaying an error such as a foreign matter failure by light-emitting diodes, a display panel, or the like. After power supply control circuit 16 has turned off the power supply, and when the power supply is turned on again, if the detection of foreign matter by foreign matter detector 26 has been canceled, then power supply control circuit 16 turns on the power supply.

In case an image output is shut off rather than turning off light source lamp 21, then an error message is displayed as a warning by the OSD. In case an image output is shut off upon detection of foreign matter, then only the original image signal is shut off at a stage prior to the OSD switcher. Since projector 1 displays an all-black image and can display only an OSD image, an error message can be displayed on the screen for the user to confirm the error. The error message is preferably of a size that is so small as not to make the projection light hot, e.g., of a size that is not greater than 1/10 of the projected image size, and is of a brightness that is so small as not to make the projection light hot, e.g., of a brightness achieved by displaying a dark color such as gray or the like rather than white.

According to the first embodiment, since the single detecting circuit is capable of detecting whether foreign matter is present in the light path or not, projector 1 is made up of a minimum number of parts and is highly efficient. Projector 1 thus has a reduced number of parts, consumes a reduced current, and can be manufactured at a reduced cost. Projector 1 can also be used in safety even if it is desired for higher luminance because it has detecting circuit 13 for preventing a sharp temperature rise due to foreign matter.

Figure 7:
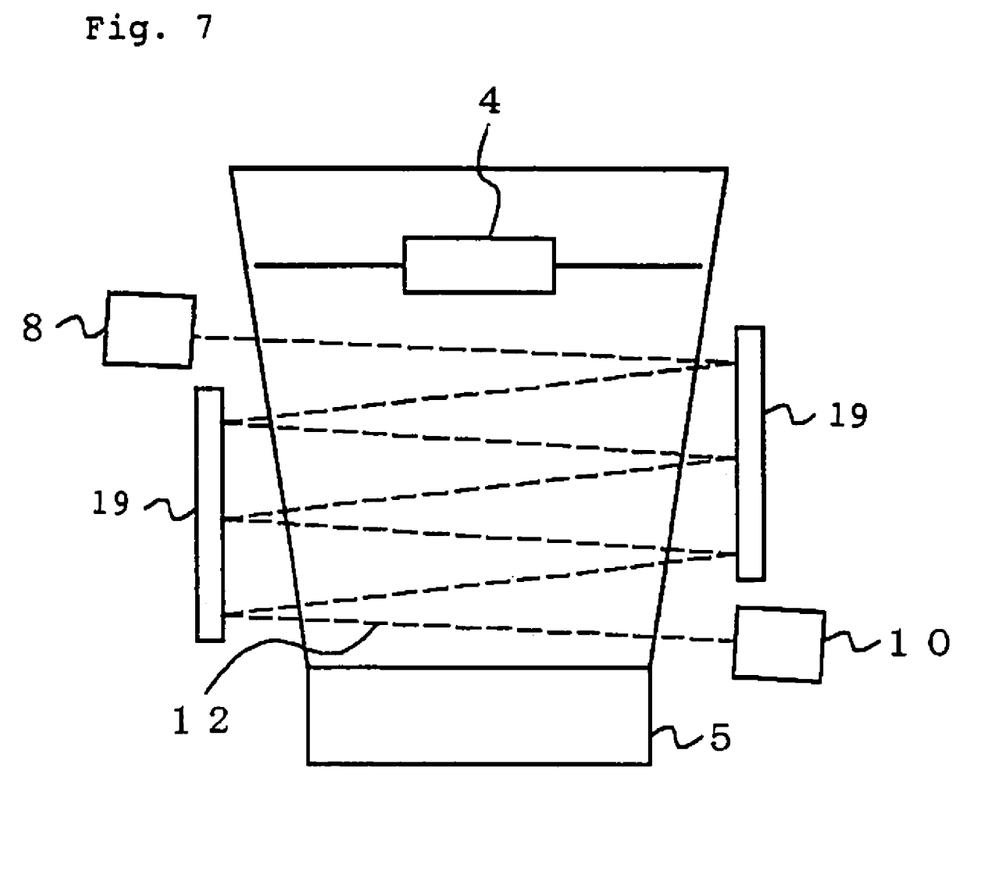
FIG. 7 is a plan view of a foreign matter detector of a projector according to a second embodiment of the present invention.

FIG. 7 shows in plan a foreign matter detector of a projector according to a second embodiment of the present invention. The number of detection mirrors for reflecting detection light emitted from the light-emitting element is selected depending on a range of space where to detect foreign matter and the size of foreign matter to be detected. If the number of times that the detection light is reflected is to be increased, then the number of detection mirrors may be increased. According to the second embodiment, however, as shown in FIG. 7, two relatively large detection mirrors 19 are disposed in confronting relation to each other across the light path, such that detection light 12 is reflected at a plurality of points on each of detection mirrors 19. According to the second embodiment, a range of space where to detect foreign matter can be established as desired by changing the size of the detection mirrors and the number of times that the detection light is reflected thereby. By reducing spaces between the light beams reflected by each detection mirror, the foreign matter detector can detect relatively small foreign matter. The spaces between the light beams reflected by each detection mirror can be selected as desired depending on the size of foreign matter to be detected.

Figure 8A:
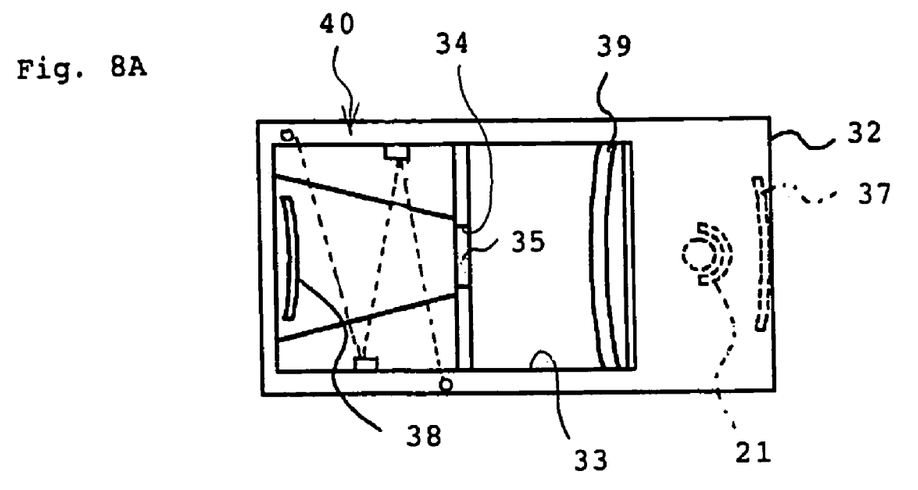
FIG. 8A is a plan view of a projector according to a third embodiment of the present invention.
Figure 8B:
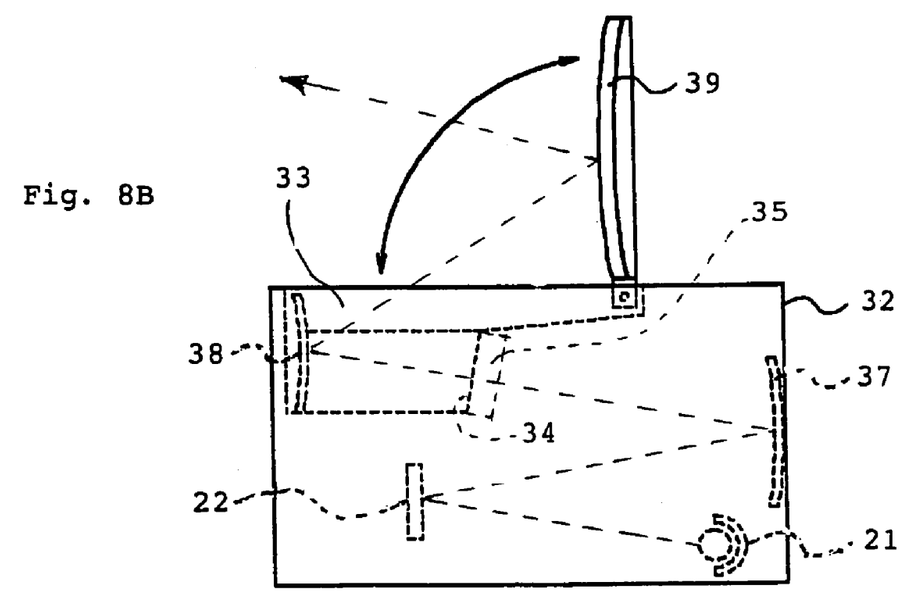
FIG. 8B is a side elevational view of the projector according to the third embodiment of the present invention.

FIG. 8A shows in plan a projector according to a third embodiment of the present invention, and FIG. 8B shows in side elevation the projector according to the third embodiment of the present invention. The projector according to the third embodiment has a reflection mirror 38 for reflecting image projection light to the projection mirror, instead of opening lens 4 described above.

As shown in FIGS. 8A and 8B, the projector comprises housing 32 having opening 33 for emitting therethrough projection light. An inner wall of opening 33 has emission port 34 for emitting therethrough image projection light from image generating device 22. Protective lens 35 through which the image projection light from image generating device 22 passes is disposed in emission port 34. The interior of opening 33 is sealed and emission port 34 is closed by protective lens 35 for preventing dust particles from entering through opening 33 into housing 32.

Image projection light from image generating device 22 is reflected by reflection mirror 37, passes through protective lens 35 in emission port 34, and is applied to reflection mirror 38. The image projection light that is applied to reflection mirror 38 is reflected thereby and applied to projection mirror 39, which reflects the image projection light to project an image represented thereby onto a projection surface.

As in the projectors according to the first and second embodiments, the projector according to the third embodiment has foreign matter detector 40 for detecting foreign matter which enters the light path of the image projection light between reflection mirror 38 and projection mirror 39. Details of foreign matter detector 40 will not be described below as it is identical in structure to foreign matter detector 26 of projector 1 according to the first embodiment.

While preferred embodiments of the present invention have been described using specific terms, such description is for illustrative purposes only, and it is to be understood that changes and variations may be made without departing from the spirit or scope of the following claims.

What is claimed is:

1. A projector comprising:
   an image generating device for generating an image;
   a housing having said image generating device disposed therein and having an opening defined therein for emitting therethrough projection light representing the image from said image generating device;
   a projection mirror mounted on an outer surface of said housing, the projection mirror being positioned to reflect said projection light onto a projection surface;
   an optical element disposed in said opening so as to transmit said projection light to said projection mirror; and
   a foreign matter detector arranged so as to detect a presence of foreign matter located in a light path of the projection light between said optical element and said projection mirror.

2. A projector according to claim 1, wherein said optical element comprises a projection lens for projecting said projection light.

3. A projector according to claim 1, wherein said foreign matter is disposed in said opening.

4. A projector according to claim 1, wherein said opening defined in said housing has a sealed interior.

5. A projector according to claim 1, wherein said foreign matter detector comprises:
   a light emitter positioned so as to emit detection light across said light path of the projection light;
   a plurality of detection mirrors positioned so as to reflect said detection light across said light path of the projection light;
   a light-detecting element positioned so as to receive said detection light which has been reflected by said detection mirrors; and
   an electric projector control circuit connected to receive an output signal generated by the light-detecting element.

6. A projector according to claim 5, wherein said light-emitting element comprises a semiconductor light-emitting device that emits detection light having a wavelength different from the wavelength of said projection light.

7. A projector according to claim 5, wherein said light-detecting element comprises a semiconductor light-detecting device.

8. A projector according to claim 5, wherein said detection mirrors are disposed in confronting relation to each other across said light path of the projection light.

9. A projector according to claim 5, wherein said detection mirrors comprise two detection mirrors which are disposed in confronting relation to each other across said light path of the projection light, the two detection mirrors being positioned so as to reflect said detection light in multiple paths therebetween.

10. A projector according to claim 5, wherein said electric projector control circuit comprises:
   a detecting circuit that receives the output signal from said light-detecting element;
   a lamp control circuit that receives as an input the output signal from said detecting circuit, and based on the output signal from the detecting circuit controls whether a light source lamp that emits the projection light is on or off;
   a timer circuit that receives as an input the output signal from said detecting circuit and measures a duration of a current state of the output signal from the detecting circuit; and
   a power supply control circuit that receives as an input an output from the time circuit, the power supply control circuit being constructed to control a power supply of the projector in response to the output received from said timer circuit.

11. A projector according to claim 1, wherein said optical element comprises a projection mirror positioned so as to reflect said projection light.

12. A projector comprising:
   an image generating device for generating an image;
   a housing having said image generating device disposed therein and having an opening defined therein for emitting therethrough projection light representing the image from said image generating device;
   a projection mirror mounted on an outer surface of said housing, the projection mirror being positioned to reflect said projection light onto a projection device;
   a foreign matter detector arranged so as to detect a presence of foreign matter located in a light path of the projection light.

13. The projector according to claim 12, wherein said foreign matter detector is disposed in said opening.

14. The projector according to claim 12, wherein said opening defined in said housing has a sealed interior.

15. The projector according to claim 12, wherein said foreign matter detector comprises:
   a light emitter positioned so as to emit detection light across said light path of the projection light;
   a plurality of detection mirrors positioned so as to reflect said detection light across said light path of the projection light;
   a light-detecting element positioned so as to receive said detection light which has been reflected by said detection mirrors; and
   an electric projector control circuit connected to receive an output signal generated by the light-detecting element.

16. The projector according to claim 15, wherein said light-emitting element comprises a semiconductor light-emitting device that emits detection light having a wavelength different from the wavelength of said projection light.

17. The projector according to claim 15, wherein said light-detecting element comprises a semiconductor light-detecting device.

18. The projector according to claim 15, wherein said detection mirrors are disposed in confronting relation to each other across said light path of the projection light.

19. The projector according to claim 15, wherein said detection mirrors comprise two detection mirrors which are disposed in confronting relation to each other across said light path of the projection light, the two detection mirrors being positioned so as to reflect said detection light in multiple paths therebetween.

20. The projector according to claim 15, wherein said electric projector control circuit comprises:
   a detecting circuit that receives the output signal from said light-detecting element;
   a lamp control circuit that receives as an input the output signal from said detecting circuit, and based on the output signal from the detecting circuit controls whether a light source lamp that emits the projection light is on or off;
   a timer circuit that receives as an input the output signal from said detecting circuit and measures a duration of a current state of the output signal from the detecting circuit; and
   a power supply control circuit that receives as an input an output from the timer circuit, the power supply control circuit being constructed to control a power supply of the projection in response to the output received from said timer circuit.

* * * * *